United States Patent Office

3,167,540
Patented Jan. 26, 1965

3,167,540
DERIVATIVES OF 7-D-RIBOFURANOSYL-
PYRROLOPYRIMIDINES
John Edward Pike, Kalamazoo, Paul Fears Wiley, Texas
Township, Kalamazoo County, and Libor Slechta,
Kalamazoo, Mich., assignors to The Upjohn Company,
Kalamazoo, Mich., a corporation of Delaware
No Drawing. Filed July 12, 1963, Ser. No. 294,751
6 Claims. (Cl. 260—211.5)

This invention relates to a novel composition of matter and to a process for the production thereof. More particularly, this invention relates to novel hydroxy and mercapto analogs of the antibiotic sparsomycin A.

Sparsomycin A is a biosynthetic product produced by the controlled fermentation of *Streptomyces sparogenes* var. *sparsogenes*.

Sparsomycin A has the following structural formula:

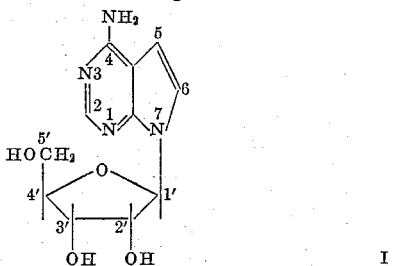

It has now been found, according to this invention, that by replacement of the 4-amino group in sparsomycin A, there is obtained 7-D-ribofuranosyl-7H-pyrrolo[2,3-d]-pyrimidin-4-ol which can be represented as follows:

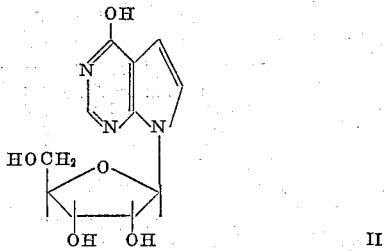

Novel compounds, according to this invention, are also obtained by acylating Compound II to give 7-D-ribofuranosyl-7H-pyrrolo[2,3-d]pyrimidin-4-ol 2',3',5'-triacylate (Formula III). Upon reacting compounds of Formula III with phosphorous pentasulfide, the 4-hydroxyl is replaced by a 4-mercapto group to produce 7-D-ribofuranosyl-7H-pyrrolo[2,3-d]pyrimidine-4-thiol 2',3',5'-triacrylate (Formula IV). Compounds of Formula IV can be readily deacylated to give 7-D-ribofuranosyl-7H-pyrrolo[2,3-d]pyrimidine-4-thio (Compound V).

The sequence of the above reactions can be shown as follows:

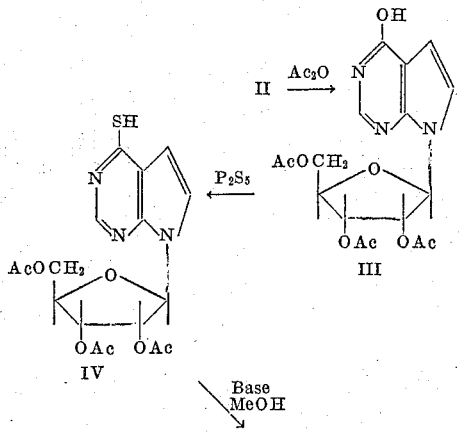

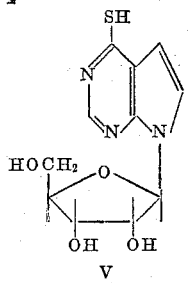

wherein Ac is an acyl group selected from the group consisting of hydrocarbon carboxylic acid acyl of from 2 to 12 carbon atoms, inclusive; halo-, nitro-, hydroxy-, amino-, cyano-, thiocyano-, and lower-alkoxy-substituted hydrocarbon carboxylic acid acyl of from 2 to 12 carbon atoms, inclusive; and lower-alkoxy carbonyl.

The term "hydrocarbon carboxylic acid acyl of from two to twelve carbon atoms," whenever used in the specification or claims is intended to mean an acyl corresponding to a hydrocarbon dcarboxylic acid of from two to twelve carbon atoms, inclusive. Suitable such acids include (a) a saturated or unsaturated, straight or branched chain aliphatic carboxylic acid, for example, acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) a saturated or unsaturated cycloaliphatic carboxylic acid, for example, cyclobutanecarboxylic acid, cyclopentane-carboxylic acid, cyclopentenecarboxylic acid, methylcyclopentene-carboxylic acid, cyclohexane-carboxylic acid, dimethylcyclohexene-carboxylic acid, dipropylcyclohexane-carboxylic acid, and the like; (c) a saturated or unsaturated cycloaliphatic-substituted aliphatic carboxylic acid, for example, cyclopentane-acetic acid, cyclopentane-propionic acid, cyclopentene-acetic acid, cyclohexane-butyric acid, methylcyclohexane-acetic acid, and the like; (d) an aromatic carboxylic acid, for example, benzoic acid, toluic acid, naphthoic acid, ethylbenzoic acid, isobutylbenzoic acid, methylbutylbenzoic acid, and the like; and (e) an aromatic-aliphatic carboxylic acid, for example, phenylacetic acid, phenylpropionic acid, phenylvaleric acid, cinnamic acid, phenylpropiolic acid, and naphthylacetic acid, and the like.

The term "halogen-, nitro-, hydroxy-, amino-, cyano-, thiocyano-, and lower-alkoxy-substituted hydrocarbon carboxylic acid acyl of from two to twelve carbon atoms, inclusive" is intended to mean hydrocarbon carboxylic acid acyl as hereinbefore defined which are substituted by one or more halogen atoms, nitro, hydroxy, amino, cyano, thiocyano, or lower-alkoxy groups. By "lower-alkoxy" is meant an alkoxy group of from one to six carbon atoms, inclusive, for example, methoxy, ethoxy, propoxy, butoxy, pentyloxy, hexyloxy, and isomeric forms thereof. Examples of substituted hydrocarbon carboxylic acid acyl falling within the above definition are the acyl corresponding to chloroacetic acid, chloropropionic acid, bromobutyric acid, iodovaleric acid, chlorocyclohexane-carboxylic acid, o-, m-, and p-chlorobenzoic acid, anisic acid, salicyclic acid, p-hydroxybenzoic acid, o-, m-, and p-nitrobenzoic acid, cyanacetic acid, thiocyanoacetic acid, cyanopropionic acid, lactic acid, glycine, ethoxyformic (ethyl hemicarbonate), and the like.

Acylation of Compound II is accomplished by reaction with the acid anhydride or the acid chloride of any monocarboxylic acid such as for example, acetic anhydride, acetyl chloride, or benzoyl chloride, and like acrylating reagents. For example, on reacting Compound II with acetic anhydride in the presence of pyridine, there is obtained 7-D-ribofuranosyl-7H-pyrrolo[2,3-d]pyrimidin-4-ol 2′,3′,5′-triacetate (III).

Substitution of a mercapto group for the hydroxyl at the 4-position of a compound of Formula III is accomplished by reaction with phosphorous pentasulfide in the presence of an organic base such as pyridine, lutidine collidine, and the like. Although the reaction is mildly exothermic, it is generally advantageous for the reaction mixture to be heated, e.g., advantageously at reflux temperature, in order to obtain good yield. However, the reaction can be run at room temperature.

The compound of Formula IV can be deacylated conveniently with an alcoholic solution of a nitrogen base such as ammonia, an amine, a quaternary ammonium base, or hydrazine at a temperature of about −5 to +10° C., preferably about 0 to +5° C. Suitable alcohols include ethanol and methanol.

The novel compounds of this invention, 7-D-ribofuranosyl-7H-pyrrolo[2,3-d]pyrimidin-4-ol (II) and 7-D-ribofuranosyl-7H-pyrrolo[2,3-d]pyrimidine-4-thiol (V), and their respective acylates, readily form acid addition salts with acid, for example, with such acids as hydrochloric, picric, citric, succinic, maleic, tartaric, and fluosilicic acids. The acid addition salts are useful in purifying the free bases because of the difference in the solubilities and physical characteristics of the acid addition salts and the free bases. The fluosilicate salts are useful for moth-proofing in accordance with U.S. Patents 1,915,334 and 2,075,359.

In order to further characterize the novel compounds of this invention, the novel compounds were submitted for assay in vitro against human epidermoid cancer cells (KB cells). The results obtained show that Compound II had an activity of 0.56 mcg./ml. ($ID_{50}$) and Compound V had an activity 4-6 mcg./ml. ($ID_{50}$) against the KB cells in the in vitro test. These compounds are useful for the inhibition of KB cells contaminants on instruments in physicians' offices and hospitals, for example, for washing surgeons gloves and instruments during surgery as recommended by Cole et al., "Dissemination of Cancer," page 405, Appleton-Century-Crofts, New York, 1961.

Furthermore, the novel Compounds II and V can be alkylated, for example, by Hoffmann's procedure [Wheeler and Hoffmann, J. Am. Chem. Soc., 44, 113 (1911)] to give O and S alkylated compounds having modified properties, but still retaining properties making them useful for the same purposes as given above for II and V.

The following examples are illustrative of the process and products of the present invention but are not to be construed as limiting.

EXAMPLE 1

*7-D-ribofuranosyl-7H-pyrrolo[2,3-d]pyrimidin-4-ol*
*(Compound II)*

A solution of sparsomycin A (I), 8.15 g. in 450 ml. of water, was prepared by boiling the solution with stirring. Barium nitrite (36 g.) was added to the hot solution, and the reaction mixture was allowed to cool. When the temperature was approximately 65° C., acetic acid (18 ml.) was added drop-wise and the cooling allowed to continue to room temperature. The reaction was allowed to proceed overnight (18 hrs.) at room temperature. Sodium sulfate (50 g.) was then added to the stirred solution and the barium sulfiate which precipitated was collected by filtration. Lead acetate (60 g.) was added to the filtrate and the insoluble material was removed by filtration. After making the aqueous filtrate alkaline with excess aqueous ammonia, the lead salt was collected by filtration, washed carefully with water and dried in vacuo. This salt was then dissolved in 200 ml. of 20% aqueous acetic acid and hydrogen sulfide was passed into this solution. Insoluble lead sulfide was removed by filtration and the precipitate was washed with water. The acetic acid-water was then removed from the filtrate by freeze-drying. A crop of Compound II (2.13 g.) was obtained by trituration of the residue with water, washing with water and drying in vacuo. A second crop (1.76 g.) was obtained from the mother liquors. Further crystallization of these two crops of Compound II from water gave crop 3, 1.21 g.; melting point 240–242° C., and crop 4, 1.14 g., melting point 242–247° C.

The sparsomycin A used in the above example was prepared as follows:

A. FERMENTATION

A soil stock of *Streptomyces sparsogenes* var. *sparsogenes*, NRRL 2940, was used to inoculate a series of 500-ml. Erlenmeyer flasks each containing 100 ml. of seed medium consisting of the following ingredients:

Glucose monohydrate _____ 25 grams.
Pharmamedia [1] _____ 25 grams.
Tap water, q.s. _____ 1 liter.

[1] Pharmamedia is an industrial grade of cottonseed flour produced by Traders Oil Mill Co., Fort Worth, Tex.

The seed medium presterilization pH was 7.2. The seed was grown for two days at 28° C. on a Gump rotary shaker operating at 250 r.p.m.

One shake flask of the seed described above (100 ml.) was used to inoculate a 20-liter seed tank containing 15 liters of the above sterile seed medium (S-1) plus 1 ml./l. of lard oil. The seed tank was grown for 24 hours at a temperature of 28° C., aeration rate of 10 standard liters/min., and agitated at a rate of 400 r.p.m.

The seed tank, described above, was then used to inoculate a 380-liter fermentor containing 250 liters of the following sterile medium:

Glucose monohydrate _____ g./liter__ 10
Dextrin _____do____ 15
Pharmamedia _____do____ 20
Wilson's Peptone Liquor No. 159 [1] _____do____ 5
Lard oil _____ml./liter__ 2
Tap water _____ Balance

[1] Wilson's Peptone Liquor No. 159 is a preparation of hydrolyzed proteins from animal origin.

The fermentation then proceeded for 113 hours during which time the temperature was controlled at 28° C., filtered air supplied at a rate of 100 standard liters/minute, and agitation at 28 r.p.m. During the course of the fermentation, 1850 ml. of lard oil was added as an antifoam.

B. RECOVERY

The whole beer from the above fermentation was adjusted from the harvested pH of 7.1 to pH 2.4 with 250 ml. of sulfuric acid (concentrated) and filtered using 3.6% diatomaceous earth as filter aid. The filter cake was washed with 0.2 volume of deionized water, the clear beer plus wash (vol. 280 liters) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred one hour with 1% decolorizing carbon and 3% diatomite. The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 liters) was adjusted to pH 6.4 with 30 ml. of 50% aqueous sodium hydroxide and concentrated to an aqueous solution (40 liters). The concentrate was adjusted to pH 5.9 and freeze dried to give 447 g. of lyophilized material.

An additional 1126 g. was obtained by twice repeating the above fermentation and recovery. The combined lyophilized material (1573 g.) was slurried in 10 liters of methanol at 40° C. for one hour. Insoluble material was filtered off and washed three times with 500 ml. of warm methanol (40° C.). The methanol extracts and washes were combined (11.5 liters) and concentrated in vacuo to a dry preparation weighing 321 g. and assaying 1.25 *Proteus vulgaris* biounits/mg.

C. PURIFICATION

Three hundred grams of the above preparation was placed in a partition column which was prepared and developed in the following manner. A solvent system was made using equal volumes (350 liters) of McIlvaine's pH 6.0 buffer and methyl ethyl ketone. A slurry containing 9.6 kg. of diatomite in 60 liters of upper phase and 4.8 liters of lower phase of the above described solvent system was poured into a 12″ column and packed with 4 p.s.i.g. of nitrogen. The column feed was dissolved in 3 liters of lower phase, slurried with 1920 g. of diatomite and enough upper phase added to make it mobile. The feed was carefully added to the top of the column bed which was covered with a layer of sea sand. The column was eluted with upper phase solvent at a rate of 2 l./minute. Four-liter fractions were collected except at the beginning and end of the column when 20-liter fractions were collected. The fractions were concentrated and bioactivities observed on *P. vulgaris* trays.

Fractions 11–20, inclusive, from the above described partition column contained sparsomycin A. These fractions were pooled and concentrated under reduced pressure and 7.2 grams of crystalline material was isolated. These crystals were dissolved in 400 ml. of water and 50 ml. of 0.1 N HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 grams of preparation A. Two grams of this preparation (A) were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml. of water, and dried to yield 1.52 grams of sparsomycin A having a melting point of 247.8–250° C., an optical rotation $[\alpha]_D^{25}$ −62° (c.=0.718 in 0.1 N HCl), an equivalent weight of 269, pKa' of 5.07 in water, an ultra-violet absorption spectrum in Water _____ 270 m$\mu$, $a$=44.14.
0.01 N $H_2SO_4$ _____ 227 m$\mu$, $a$=85.28.
                               271 m$\mu$, $a$=40.82.
0.01 N KOH _____ 270 m$\mu$, $a$=43.50.

a characteristic IR absorption at the following frequencies expressed in reciprocal centimeters

| | |
|---|---|
| 3350 (S) | 1198 (W) |
| 3250 (S) | 1160 (W) |
| 3145 (S) | 1134 (M) |
| 3095 (S) (sh.) | 1120 (M) |
| 2880 (S) (oil) | 1093 (M) |
| 2810 (S) (oil) | 1080 (W) |
| 1895 (W) | 1055 (M) |
| 1640 (S) | 1042 (S) |
| 1592 (S) | 1017 (S) |
| 1553 (M) | 992 (S) |
| 1502 (M) | 953 (W) |
| 1475 (M) | 912 (W) |
| 1548 (S) (oil) | 903 (M) |
| 1445 (M) (sh.) | 867 (M) |
| 1426 (M) | 852 (W) |
| 1370 (M) (oil) | 842 (W) |
| 1351 (M) | 799 (W) |
| 1306 (M) | 715 (W) |
| 1276 (W) | 704 (S) |
| 1255 (S) | 675 (M) |
| 1221 (M) | 658 (M) | and the following elemental analysis:

Calculated for $C_{11}H_{14}N_4O_4$: C, 49.62; H, 5.30; N, 21.04. Found: C, 49.81; H, 5.20; N, 20.92.

EXAMPLE 2

*7-D-ribofuranosyl-7H-pyrrolo[2,3-d]pyrimidin-4-ol 2′,3′,5′-triacetate (III)*

A solution of (II) was made by dissolving 1.74 g. of (II), prepared as in Example I, in 45 ml. pyridine with warming. After cooling in an ice-salt bath, acetic anhydride (15 ml.) was added drop-wise. The reaction mixture was allowed to stand for 1.5 hours at 0° to +5° C. and then for 18 hrs. at +5° C. At the end of this reaction period 9 ml. of water was added to the reaction mixture and the solution stirred for 4 hours at room temperature. The solvents in the mixture were then removed in a stream of nitrogen at approximately 50° C. and the residue was portioned between methylene chloride and water. The methylene chloride extracts were washed with water, dilute sulfuric acid, water, and dried ($Na_2SO_4$). Removal of the solvents gave an oil which was shown by infrared spectrum to be in agreement with the structure of 7-D-ribofuranosyl-7H-pyrrolo[2,3-d]pyrimidin-4-ol 2′,3′,5′triacetate (Compound III).

EXAMPLE 3

By substituting the acetic anhydride in Example 2 by propionic, succinic, maleic, and phthalic anhydride there is obtained the corresponding 7-D-ribofuranosyl-7H-pyrrolo[2,3-d]pyrimidin-4-ol 2′,3′,5′-tripropionate, -succinate, -maleate, and -phthalate.

EXAMPLE 4

By substituting the acetic anhydride and pyridine in Example 1 by acetyl chloride, propionyl bromide, butyryl chloride, valeryl chloride, caproyl chloride, heptanoyl chloride and caprylyl chloride and at least a stoichiometric amount of triethylamine there is obtained the corresponding 7-D-ribofuranosyl-7H-pyrrolo[2,3-d]pyrimidin-4-ol 2′,3′,5′-triacetate, -propionate, -butyrate, -valerate, -caproate, -heptanoate, and caprylate.

EXAMPLE 5

*7-D-ribofuranosyl-7H-pyrrolo-[2,3-d]pyrimidine-4-thiol 2′,3′,5′-triacetate (Compound IV)*

To a solution of Compound III, 2.599 g. in 75 ml. pyridine, was added 6.0 g. of phosphorous pentasulphide and the reaction mixture was stirred at 30° C. for 2 hrs. The mixture was then heated to 85–90° C. for 18 hrs. under nitrogen. After cooling, 15 ml. of water was added and the mixture stirred 1 hr. at room temperature. The solvent in the mixture was removed in a nitrogen stream with the temperature at approximately 50° C. The residue was partitioned between methylene chloride and water. The organic extracts were washed with water, dilute aqueous acid, water, and dried ($Na_2SO_4$). Removal of the solvent gave an oil (2.87 g.). This material was dissolved in $CH_2Cl_2$ and chromatographed on 300 g. of Florisil (a synthetic silicate of the type described in U.S. Patent 2,393,625 and sold by the Floridin Company) (gradient elution:benzene→ethyl acetate→5% methanol:ethyl acetate). Those fractions which showed a λ max. (EtOH) 325 m$\mu$ and gave one spot on TLC (thin layer chromatography) were pooled to yield 2.103 grams of 7-D-ribofuranosyl - 7H - pyrrolo-[2,3-d]pyrimidine-4-thiol 2′,3′,5′-triacetate (IV).

EXAMPLE 6

*7-D-ribofuranosyl-7H-pyrrolo[2,3-d]pyrimidine-4-thiol (V)*

A solution of (IV), prepared as in Example 5, 1.0 gm. in 30 ml. methanol, was allowed to stand 18 hrs. at room temperature with 6.0 ml. of 27% methanolic sodium methoxide. At the end of the reaction period, acetic acid was added to pH 7. The methanol was then removed in vacuo and the residue was crystallized from water to give 0.46 gm. of 7-D-ribofuranosyl-7H-pyrrolo[2,3-d]pyrimidine-4-thiol (V) having a melting point of 204–207° C.

We claim:
1. A compound of the formula:

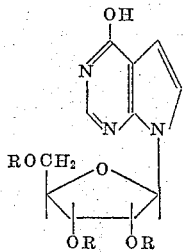

wherein R is selected from the group consisting of hydrogen, hydrocarbon carboxylic acid acyl of from two to twelve carbon atoms, inclusive; halo-, nitro-, hydroxy-, amino-, cyano-, thiocyano-, and lower-alkoxy substituted hydrocarbon carboxylic acid acyl of from two to twelve carbon atoms, inclusive; and lower-alkoxycarbonyl.

2. 7-D-ribofuranosyl - 7H-pyrrolo[2,3-d]pyrimidin-4-ol.

3. 7-D-ribofuranosyl - 7H-pyrrolo[2,3-d]pyrimidin-4-ol 2′,3′,5′-triacetate.

4. A compound of the formula:

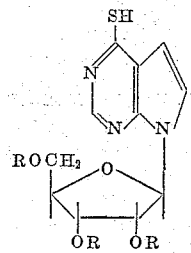

wherein R is selected from the group consisting of hydrogen, hydrocarbon carboxylic acid acyl of from two to twelve carbon atoms, inclusive, halo-, nitro-, hydroxy-, amino-, cyano-, thiocyano-, and lower-alkoxy-substituted hydrocarbon carboxylic acid acyl of from two to twelve carbon atoms, inclusive; and lower-alkoxycarbonyl.

5. 7-D-ribofuranosyl - 7H - pyrrolo[2,3-d]-pyrimidine-4-thiol.

6. 7-D-ribofuranosyl - 7H - pyrrolo[2,3-d]-pyrimidine-4-thiol 2′,3′,5′-triacetate.

References Cited in the file of this patent
UNITED STATES PATENTS 3,049,536    Reiff et al. _____ Aug. 14, 1962

OTHER REFERENCES

Dovall et al.: J.A.C.S., vol. 73, April 1951, pages 1650–1655.

Fox et al.: J.A.C.S., vol. 80, No. 7, Apr. 5, 1958, pages 1669–1675.